July 18, 1933.  C. M. BRICKER  1,919,006

DOUGH BLENDER

Filed Aug. 10, 1931

INVENTOR.
Carrie M. Bricker
BY
ATTORNEYS.

Patented July 18, 1933

1,919,006

UNITED STATES PATENT OFFICE

CARRIE M. BRICKER, OF EAST CLEVELAND, OHIO

DOUGH BLENDER

Application filed August 10, 1931. Serial No. 556,161.

This invention relates to an improved form of dough blender adapted for mixing lard and flour in the preparation of pastry dough.

As is well known to those who are familiar with the pastry art, the first step in the preparation of pastry dough is to intimately mix the lard and flour and during such process, it is desirable not to employ the hands for such purpose because of the heat of the body which will cause the lard to melt and thereby prevent the desirable lightness of the pastry.

Attempts have been made to mix the lard with the flour by means of ordinary knives with which the lard is "cut into" the flour, but this procedure involves the expenditure of considerable time. Furthermore, the familiar form of knife with the straight or single blade is not well adapted for scraping or scooping the lard and flour together during the process of cutting the lard into the flour.

There has also been devised a pastry fork with cutting edges which are intended to cut the lard into the flour, but such a device lacks the particular features of novelty and advantages which are present in my device, as will more fully hereinafter appear.

There have been devised also other forms of knives which have corrugated blades but which are intended and adapted only for the cutting or chopping of fruits and vegetables into various fanciful designs or for the purpose of merely mincing the same, and are not capable of performing the function of my device. Such knives are neither intended nor adapted for cutting the lard into the flour in the preparation of pastry since the convolutions found in such fruit and vegetable knives are either too close together or too far apart. That is, the convolutions are either too shallow or too deep. In those cases where the grooves are too shallow and too close together, the effect of such cutting action would be practically the same as that of a straight or plain form of blade, and also the lard and flour would clog the grooves which must therefore be frequently cleaned of these ingredients during the "cutting in" operation. The blades or other cutting devices in which the convolutions or grooves are extremely deep would likewise be clogged by accumulations of lard and flour and would therefore likewise require frequent removal of the same so as to permit continued use for the purpose stated.

Those knives or other devices in which the blade is formed with angular or zig-zag convolutions are not adapted for the purpose of my device because of the fact that the lard and flour will clog in the more or less sharp, angular corners, and also because such devices are not adapted for scooping or scraping the lard and flour together in the manner to be hereinafter explained. Some of the prior devices are incapable of the scraping or scooping operation for the further reason that the bottom edge of the blade is inclined.

Therefore, having in mind the failures of prior cutting and chopping devices to perform the operation herein referred to, I have devised a dough blender which is adapted to intimately mix together the lard and flour by cutting the lard into the flour in a comparatively rapid and efficient manner. My present form of device is especially adapted not only for cutting the lard into the flour by means of the sinuous form of cutting member, but also for use in scraping or scooping the lard and flour during the blending operation.

By experimentation, I have discovered the particular sinuous form of cutting body which is peculiarly well adapted for this purpose and which equally well accommodates the fingers of the hand to pass along the depressions of said cutting body for the purpose of cleaning the same.

The form of dough blender herein disclosed may be employed for the purpose herein stated with minimum danger of becoming clogged by the accumulation of lard and flour in the grooves of the cutting member, during either the "cutting in" or the scraping and scooping operation.

Accordingly, the object of the present invention is to devise a dough blender of the nature and possessing the advantages hereinbefore mentioned; and for the purpose of a fuller understanding of the same, reference is had to the accompanying drawing.

Figure 1:
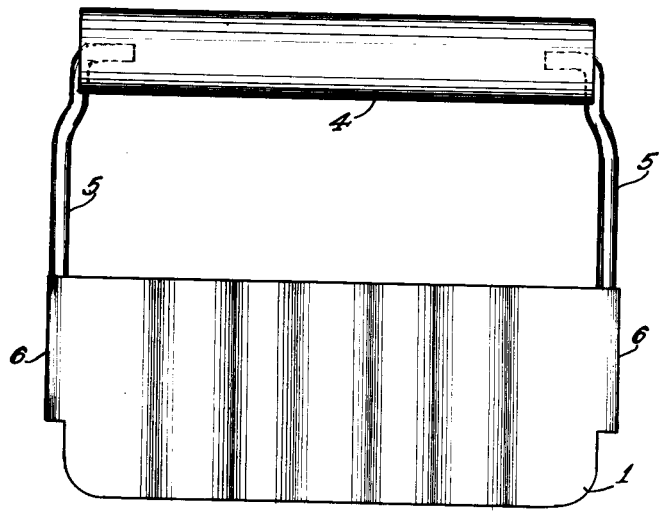
Fig. 1 shows my improved form of devices in elevation.
Figure 2:
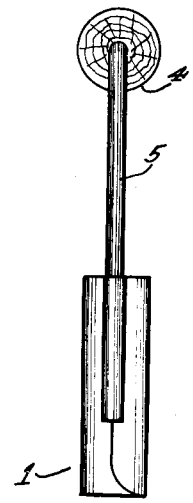
Fig. 2 is an end view of the same.
Figure 3:
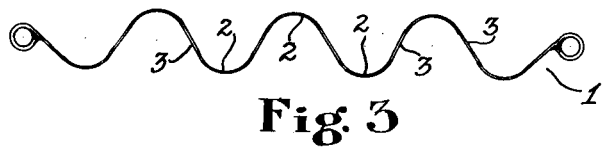
Fig. 3 is an inverted plan view thereof.

The cutting body in the present case consists of comparatively thin sheet metal which may be pressed into the sinuous form substantially as indicated in the drawing. When pressed into such form, this cutting body will be comparatively rigid and it is to be understood that any other suitable form or grade of material may be employed for this purpose.

The cutting body, which is indicated by reference numeral 1, is formed with the grooves 2 which are of substantially one-half (½) inch in depth in actual dimension while the intermediate or connecting inclined portions 3 extend at an angle of approximately forty-five (45) degrees to the perpendicular, as indicated by the accompanying drawing.

From actual experience, I have discovered that the particular depth of the grooves and the particular angle of inclination of the intermediate portions of the cutting member, as just specified, constitute the proper form and dimensions which peculiarly adapt the present improved device for successful accomplishment of the result for which it is intended. Although it is to be understood that there may be a slight variation of or deviation from the depth of groove and degree of angle just specified, without departing from the spirit of the present invention and without sacrificing altogether the beneficial results which are obtained thereby, yet these measurements, proportions, and degree of angular relation are substantially correct and vital for the production of pastry having the desired lightness.

The body portion 1 is of substantially the same depth throughout its entire extent with the top and bottom edges thereof extending in parallel relation so that the entire body portion 1 is of substantially rectangular outline. By having the bottom edge of the body portion 1 thus formed, the scooping or scraping action of the blending device is greatly facilitated. Also, the body portion 1 is of substantially the same thickness throughout even to and including the very bottom edge thereof.

A handle is attached to the two ends of the body portion 1, preferably a bail form of handle which permits the device to be employed both for the purpose of cutting the lard into the flour and also for the scooping or scraping movement of the blending device.

The particular form of bail handle herein disclosed comprises the wood grip portion 4 which has attached to the ends thereof the bail members 5 of a suitable grade of wire which are soldered or otherwise secured to the ends of the body portion 1. In the present case, the upper portions 6 of the body portion 1 are bent about the end portions of the bail members 5 and are soldered thereto. If so desired, the ends of the bail members may be riveted or otherwise secured to the end portions of the body portion 1. In any event, the bail members 5 will be secured to the body portion 1 in such manner as to preclude the formation of any crevices or recesses in which the lard and flour may accumulate during use of the device.

Thus, in the present case, it will be seen that the entire device is so constructed as to preclude the danger of accumulation of the ingredients, whereby the blending operation is greatly facilitated and there is eliminated also the necessity of frequently removing accumulations of the ingredients therefrom.

Also, there is obtained a form of blending device which may be manufactured and sold at a comparatively low cost and in which the lard may be "cut into" the flour with comparative rapidity because of the plurality of angularly disposed cutting portions and the intermediate curved portions. The cutting portions of the device extend in different directions and are sufficiently spaced to produce an effective and rapid cutting action of the lard into the flour. Also, the grooves are of sufficient width throughout so that the ingredients can be effectively scraped or scooped together, with ample surface area allowed in the grooves. At the same time, the grooves are not so deep and their walls are not so sharply inclined or so close together as to permit serious accumulation or clogging of the pastry ingredients. Furthermore, the form and dimensions of the grooves and the spacing of the same are peculiarly well adapted to accommodate the fingers of the hand of the user for removing any particles of dough therefrom upon completion of the blending operation. In fact, in the present form of disclosure, the cutting portion 1 has a number of grooves corresponding exactly with the number of fingers upon the hand by which the same may be efficiently cleaned with a single movement of the fingers therealong.

Actual use of the present form of device has already demonstrated the production of an extreme lightness in the pastry which is produced from the dough blended by means of this device.

Other advantages will be apparent to those who are familiar with the art to which the present device relates; and it is to be understood that the present disclosure is merely for purposes of illustration and that any and all variations or modifications as are comprehended by the invention herein set forth are embraced within the scope of the following claim.

What I claim is:

A dough blender comprising a substantially rigid body portion of comparatively thin sheet material, said body portion being reversely and uniformly curved so as to have a wave form throughout from one side to the other side thereof, the grooves provided thereby in said body portion being of substantial width and of approximately one-half inch in depth throughout and free of sharp corners and having their side walls inclined at approximately forty-five degrees to the perpendicular, and a bail handle attached to the two ends of said body portion, said device being adapted for blending the dough ingredients by a cutting operation of the same in a direction lengthwise of the said grooves and by a scooping operation in a direction transversely thereof, and said grooves being adapted for ready cleaning by passage of the fingers of the hand therealong.

CARRIE M. BRICKER.